United States Patent [19]

Nelson et al.

[11] Patent Number: 4,652,132
[45] Date of Patent: Mar. 24, 1987

[54] OPTICAL POWER COMPENSATED RING LASER GYROSCOPE

[75] Inventors: William H. Nelson, Grafton; Albert N. Zampiello, Boxboro, both of Mass.

[73] Assignee: Raytheon Company, Lexington, Mass.

[21] Appl. No.: 549,357

[22] Filed: Nov. 7, 1983

[51] Int. Cl.$^4$ .............................................. G01C 19/64
[52] U.S. Cl. .................................................. 356/350
[58] Field of Search .................... 356/350, 351; 372/94

[56] References Cited

U.S. PATENT DOCUMENTS

| | | | |
|---|---|---|---|
| 3,854,819 | 12/1974 | Andringa | 356/350 |
| 4,110,045 | 8/1978 | Smith et al. | 356/350 |
| 4,213,705 | 7/1980 | Sanders | 356/350 |
| 4,470,701 | 9/1984 | Smith | 356/350 |

*Primary Examiner*—Vincent P. McGraw
*Assistant Examiner*—S. A. Turner
*Attorney, Agent, or Firm*—Walter F. Dawson; Richard M. Sharkansky

[57] ABSTRACT

A ring laser gyroscope having apparatus for compensating a gyroscope output signal for optical power variations in accordannce with variations of a dihedral frequency. A scaler quantity is determined based on operational data and it is used to compensate the gyroscope output signal. Alternatively, a gyroscope output signal is compensated via a feedback network by adjusting the gain medium in the laser gyroscope in accordance with variations in the dihedral frequency.

34 Claims, 3 Drawing Figures

OPTICAL POWER COMPENSATED RING LASER GYROSCOPE

BACKGROUND OF THE INVENTION

This invention relates to ring laser gyroscopes and in particular to an apparatus and method for compensating a gyroscope output signal to correct for error sources such as optical power variations which produce variations of a polarization split or a dihedral frequency.

Multi-oscillator ring laser gyroscopes are a significant new class of rotation sensing instruments employing four waves of two polarization pairs, each polarization pair propagating in opposite circular directions. Such systems are shown and described in U.S. Pat. Nos. 3,741,657, 3,854,819 and 4,006,989 to Keimpe Andringa and assigned to the present assignee, the specifications of those patents being herein incorporated by reference. In such laser systems, circular polarization for each of the four waves is used. The pair of waves, or beams, propagating in the clockwise direction includes both left-hand circularly polarized (LCP) waves and right-hand circularly polarized (RCP) waves as do those waves propagating in the counterclockwise direction. The separation between the LCP waves and the RCP waves in said referenced patents is provided by a crystal rotator which essentially provides a frequency bias ($f_B$). Such a biased four-frequency or multi-oscillator ring laser gyroscope provides a means for circumventing the frequency locking or lock-in problem present in all conventional or two-frequency laser gyroscopes. This lock-in phenomenon occurs when two traveling waves propagating in opposite directions in a resonant cavity at slightly different frequencies are pulled toward each other to combine in a single frequency standing wave. However, when the frequencies of the counter-rotating waves are sufficiently separated in frequency, the pulling together does not occur. The four-frequency approach may be described as two independent laser gyroscopes operating in a single stable resonator cavity, sharing a common optical path, but static biased in opposite senses by the same passive bias element. In the differential output of these two gyroscopes, the bias then cancels, while any rotation generated signals add, thereby avoiding the usual problems due to drifts in the bias and giving a sensitivity twice that of a single two-frequency gyroscope. Because the bias need not be dithered, the gyroscope never passes through lock-in. Hence, there are no dither-induced errors to limit instrument performance. For this reason, the four frequency gyroscope is intrinsically a low noise instrument, and it is well suited for applications requiring rapid position update or high resolution.

The four different frequencies are normally generated by using two different optical effects. First, a crystal polarization rotator has been used to provide a direction-independent polarization causing the resonant waves to be circularly polarized in two directions. The polarization rotation results from the refractive index of the rotation medium being slightly different for RCP and LCP waves. However, a non-planar ring path is used with this invention which inherently supports only circularly polarized waves without the use of a crystal rotator. The non-planar ring path is sometime-s considered to be a dihedral configuration providing the frequency bias ($f_B$) or polarization split frequency difference separating the circularly polarized waves; this frequency is also referred to as a dihedral frequency ($\Delta f_D$). A planar electromagnetic wave ring resonator is shown and described in U.S. Pat. No. 4,110,045 to Irl W. Smith, Jr. and Terry A. Dorschner and assigned to the present assignee. Second, a Faraday rotator is used to provide non-reciprocal polarization rotation, by having a slightly different refractive index for clockwise (cw) traveling waves than for counterclockwise (ccw) traveling waves. This causes the cw and ccw RCP waves to oscillate at slightly different frequencies while the cw and ccw LCP waves are similarly but oppositely split. Thus, a multi-oscillator laser gyroscope operates with right circular polarized waves biased in one direction of rotation and with left circular polarized waves biased in the opposite direction, the bias being cancelled by subtracting the two outputs.

An output signal of a ring laser gyroscope drifts with time due to changes in parameters such as temperature and aging. Direct measurement of these parameters generally is not accurate enough or possible. However, gyroscope output accuracy has been improved by measuring the Faraday frequency to sense temperature caused variations and then applying a correction factor to the gyroscope output signal. In this invention, the measurement of the polarization split or the dihedral frequency of a four-frequency laser gyroscope is used to correct the gyroscope output signal for optical power variations and other error sources, such as loss variations due to aging producing a variation of the polarization split or dihedral frequency.

SUMMARY OF THE INVENTION

The invention discloses an apparatus and method for improving the performance of a ring laser gyroscope by compensating a gyroscope output signal for error sources such as optical power variations in accordance with variations of a dihedral frequency ($\Delta f_D$).

A laser cavity having a closed path with a gain medium produces a plurality of circularly polarized counter-traveling electromagnetic waves of a first polarization sense and a second polarization sense and a Faraday rotator produces a direction-dependent phase shift to said waves resulting in a frequency splitting between the counter-traveling waves of the same polarization sense, each of the waves being of a different frequency. A combination of these frequencies determines the dihedral frequency which is detected.

A gyroscope output signal, which provides the rotation-induced frequency shift ($\Delta f_G$) of the electromagnetic waves within the closed path, is generated and controlled in a manner to keep the output signal substantially invariant by means in accordance with variations in the dihedral frequency ($\Delta f_D$).

One embodiment of the invention discloses a ring laser gyroscope having a cavity comprising a closed path with a gain medium for the propagation of a plurality of electromagnetic waves in opposite directions, each of the waves being of a different frequency. Left and right circularly polarized counter-traveling electromagnetic waves in the closed path are produced by a non-planar ring. This polarization splitting or frequency bias is also referred to as the dihedral frequency ($\Delta f_D$). A Faraday rotator produces a direction-dependent phase shift to the counter-traveling waves for each polarization resulting in a frequency splitting of clockwise and counterclockwise waves referred to as the Faraday frequency ($\Delta f_F$).

A first detector comprising a high frequency photodiode detects the polarized waves traveling in the same direction which may be either clockwise or counterclockwise. The frequency detected by the first detector is determined by either the traveling waves in a clockwise direction, $\Delta f_D + \Delta f_F$ which equals $f_4 - f_1$, or the traveling waves in a counterclockwise direction, $\Delta f_D - \Delta f_F$ which equals $f_3 - f_2$. A second detector detects at least two output signals of the gyroscope cavity, each of the output signals comprising a different combination of a rotation-induced frequency shift ($\Delta f_G$) and a Faraday frequency ($\Delta f_F$). A first cavity output signal equals the difference between the Faraday frequency and one-half of the rotation-induced frequency shift ($\Delta f_F - \frac{1}{2}\Delta f_G$) which is equivalent to $f_4 - f_3$. A second cavity output signal equals the sum of the Faraday frequency and one-half of the rotation-induced frequency shift ($\Delta f_F + \frac{1}{2}\Delta f_G$) which is equivalent to $f_2 - f_1$.

The outputs from both detectors are sent to a processor which determines the amount of compensation for the gyroscope output signal based on changes in varying parameters of the gyroscope. The processor comprises a memory for storing a scaler quantity which when multiplied by the dihedral frequency provides a compensation factor for the gyroscope output signal. The scaler quantity is determined by a ratio of a rate of change of the gyroscope output to a rate of change of the dihedral frequency.

An alternate embodiment of the invention is disclosed utilizing a feedback network for compensating a laser gyroscope output signal for error sources which produce variations in the dehidral frequency. A laser cavity, the same as in the other embodiment, generates circularly polarized counter-traveling waves. A detector means detects the two spacial directions of said waves independently which comprises $\Delta f_D + \Delta f_F$, traveling in the clockwise spacial direction and $\Delta f_D - \Delta f_F$ traveling in a counterclockwise spacial direction. These circularly polarized counter-traveling waves are combined by circuitry that generates the dihedral frequency which is converted to a voltage. A voltage controlled current source is adjusted by the converted voltage in accordance with the dihedral frequency and the current source controls the gain medium of the laser gyroscope cavity. Adjusting the laser cavity gain as a function of the dihedral frequency for changes in gyroscope parameters results in a gyroscope output signal being compensated by this feedback network.

A method of compensating an output signal of a multi-oscillator ring laser gyroscope comprising the steps of producing in a closed path with a gain medium a plurality of circularly polarized counter-traveling electromagnetic waves of a first polarization sense and a second polarization sense, producing a direction-dependent phase shift to the waves resulting in a frequency splitting between the counter-traveling waves of the same polarization sense, each of the waves being of a different frequency and a combination of the waves forming a dihedral frequency, detecting the dihedral frequency, and controlling an output signal in accordance with variations in the dihedral frequency, said output signal being representative of a rotation-induced frequency shift of the waves within the closed path.

The invention futher discloses a method of compensating an output signal of a multi-oscillator ring laser gyroscope comprising the steps of producing in a closed path with a gain medium a plurality of circularly polarized counter-traveling electromagnetic waves of a first polarization sense and a second polarization sense, producing a direction-dependent phase shift to the waves resulting in a frequency splitting between the counter-traveling waves of the same polarization sense, each of the waves being of a different frequency, detecting the polarized waves traveling in the same direction, a combination of the waves traveling in the same direction comprising a dihedral frequency, detecting at least two signals representative of a rotation-induced frequency shift, and processing the detected polarized waves traveling in the same direction with the signals representative of a rotation-induced frequency shift for compensating an output signal in accordance with the dihedral frequency.

The invention further discloses a method of compensating an output signal of a multi-oscillator ring laser gyroscope comprising the steps of producing in a closed path with a gain medium a plurality of circularly polarized counter-traveling electromagnetic waves of a first polarization sense and a second polarization sense, producing a direction-dependent phase shift to the waves resulting in a frequency splitting between the counter-traveling waves of the same polarization sense, each of the waves being of a different frequency, detecting independently the polarized waves traveling in only a clockwise direction and the polarized waves traveling in only a counterclockwise direction, said polarized waves in each direction comprising a dihedral frequency, and processing both the clockwise and counterclockwise polarized waves, said processing means providing signals for adjusting the gain medium for compensating an output signal of the gyroscope in accordance with variations in the dihedral frequency.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
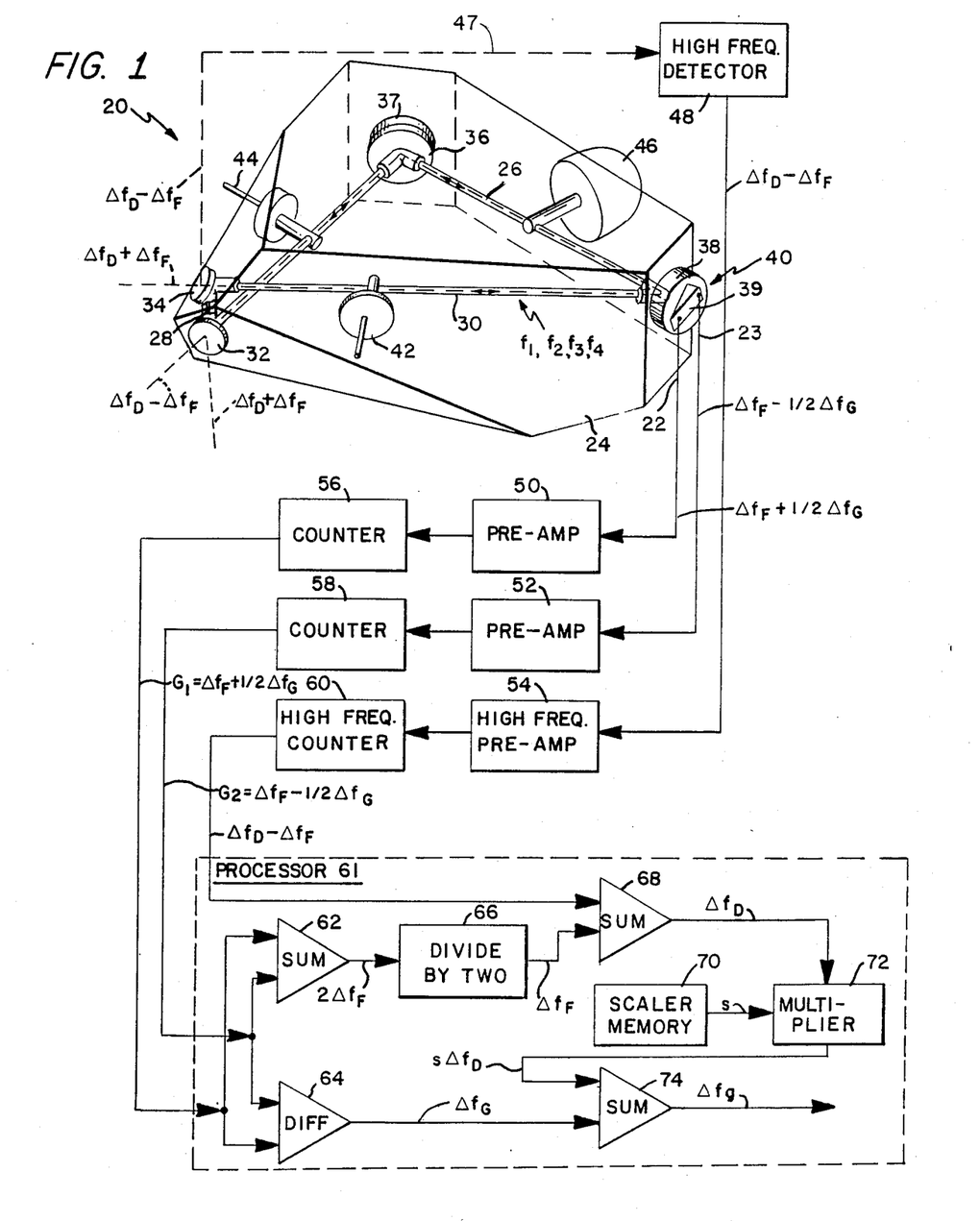
FIG. 1 is a block diagram of a laser gyroscope cavity coupled to detection and processing electronics according to the invention for compensating the gyroscope output frequency as a function of the dihedral frequency.

Referring to FIG. 1, there is shown a block diagram of a laser gyroscope cavity 20 which provides a closed path 30 for the propagation of a plurality of electromagnetic waves in opposite directions, each of the waves being of a different frequency and referred to as $f_1$, $f_2$, $f_3$ and $f_4$. There are four reflectors 34, 32, 36 and 38 for directing the waves around the closed path 30 which provides image rotation by virtue of being a nonplanar ring. The image rotation property, for this particular geometry of the optical closed path 30, splits the resonant frequencies of the cavity modes. This splitting is referred to as the polarization split or dihedral frequency ($\Delta f_D$).

A Faraday Rotator Assembly 28 provides a direction-dependent phase shift or non-reciprocal polarization rotation for the propagating waves. This frequency splitting is referred to as the Faraday frequency ($\Delta f_F$). The cavity 20 further comprises anodes 42 and 44, cathode 46 and a laser gain medium 26 having a helium-neon gas mixture where the two active isotopes are neon-20 and neon-22. The gaseous gain medium 26 is electrically excited by discharge currents generated between anodes 42 and 44 and cathode 46, and it becomes a light emitting laser gain medium or plasma, sustaining resonant electromagnetic or laser waves in the closed path 30.

Reflector 36 is attached to a piezoelectric element 37 which moves the reflector in and out as part of a cavity pathlength control system. Reflectors 32 and 34 are used for reflecting the electromagnetic waves in the closed path, however, either one of the reflectors 32 and 34 may be used to detect optical leakage signals for providing power compensation for the gyroscope output frequency. Reflector 38 is also only partially reflective, thereby allowing a small portion of the waves incident on its surface to pass through the reflector and be combined and processed to provide rotational information.

Figure 2:
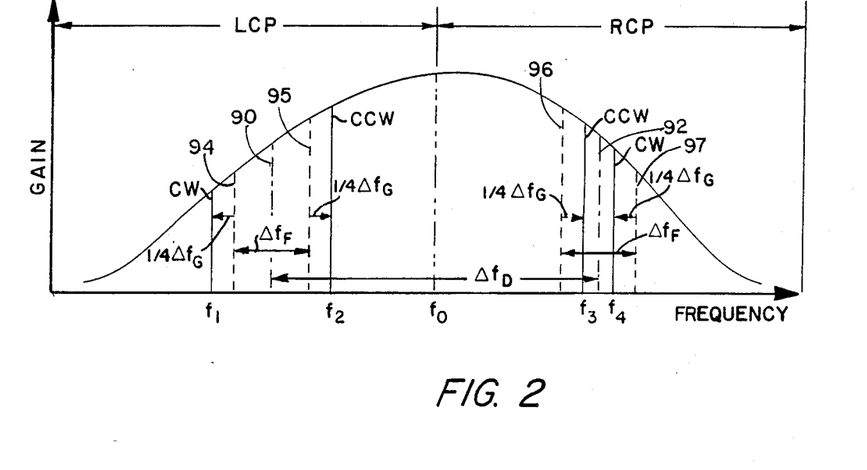
FIG. 2 is a diagram of the gain vs. frequency curve for a laser gyroscope showing the four lasing modes of a multi-oscillator ring laser gyroscope and a resulting shift in each of the lasing mode frequencies due to rotation of the gyroscope.

The output optics 40 extracts a portion of each wave circulating within the laser cavity to produce the two outputs $G_1$ and $G_2$, each one of which represents the difference in frequency between wave pairs having the same sense of circular polarization within the cavity 20 as shown in FIG. 2. The output reflector 38 has a transmission coating on one side and a beamsplitter coating on the other side. Both coatings are a standard type using alternate layers of $TiO_2$ and $SiO_2$. The beamsplitter coating transmits half the incident intensity and reflects the other half. A retro-reflecting prism 39 is used to heterodyne the two beams. This right angle prism is made of fused quartz and has silvered reflective faces. A dielectric coating is used between the silver and fused quarts to obtain minimal phase error upon reflection. A quarterwave plate followed by sheet polarizers are used to separate the four frequencies present in each beam. A wedge is used between the retro-reflecting prism and the quarterwave plate to prevent reflections from the interfaces from propagating back into the gyroscope cavity and mixing with the counter-rotating beams. A photo-diode cover glass (anti-reflection coated on one side) and a photo-diode package complete the output optics 40. An optical cement is used between the various interfaces to provide adhesion and to minimize reflections. The output optics is fully described in U.S. Pat. No. 4,141,651 to Irl W. Smith and Terry A. Dorschner and assigned to the present assighee, the specification of this patent being herein incorporated by reference.

The gyroscope block 24 is preferably constructed with a material having a low thermal coefficient of expansion, such as a glass-ceramic material to minimize the effects of temperature change upon the laser gyroscope cavity 20. A preferred commercially available material is sold under the name of Cer-Vit ® by Owens-Illinois Company; alternatively, Zerodur ® by Schott Optical Company may be used.

Still referring to FIG. 1, a combination of optical signals passing through the partially transparent reflector 34 is coupled to high frequency detector 48 which is disposed immediately adjacent to reflector 34; this combination is the difference between a dihedral frequency ($\Delta f_D$) and a Faraday frequency ($\Delta f_F$) or $\Delta F_D - \Delta f_F$ shown diagrammatically in FIG. 1 by the dotted line 47. The output of the high frequency detector 48 is coupled to a high frequency preamplifier 54 which is coupled to a high frequency counter 60 for determining the frequency of $\Delta F_D - \Delta f_F$. The output of high frequency counter 60 is coupled to an input of processor 61. Gyroscope cavity output 22 is coupled to preamplifier 50 whose output is coupled to counter 56. The output of counter 56 couples to an input of processor 61. Similarly, gyroscope cavity output 23 couples to preamplifier 52 whose output is coupled to counter 58. The output of counter 58 couples to another input of processor 61. Processor 61 combines the two gyroscope cavity outputs, G1 and G2, with the high frequency detected optical signal ($\Delta f_D - \Delta F_F$) to obtain a compensated gyroscope output signal $\Delta f_g$. The frequency output, $G_1$, from counter 56 equals $\Delta f_F + \frac{1}{2}\Delta f_G$; likewise, the frequency output from counter 58, $G_2$, equals $\Delta f_F - \frac{1}{2}\Delta f_G$. $\Delta f_G$ represents the rotationally induced frequency shift output of the multi-oscillator ring laser gyroscope. It is determined by the difference between the difference of the RCP waves ($f_4 - f_3$) and the difference of the LCP waves ($f_2 - f_1$). The $\frac{1}{2}$ factor results from each detector of the output optics 40 sensing one of the two circular polarizations, thus detecting the frequency shift of the frequencies of that particular circular polarization, as shown in FIG. 2. $G_1$ and $G_2$ are combined in a sum 62 circuit to produce the signal $2\Delta f_F$. This signal is coupled to a divide by two 66 circuit, the output of which is $\Delta f_F$, the Faraday frequency. A sum 68 circuit receives at one of its inputs the $\Delta f_F$ signal and at another input the $\Delta F_D - \Delta f_F$ signal from the high frequency $\Delta f_d$ counter 60 and provides at its output the dihedral frequency $\Delta f_D$ which is fed to multiplier 72. A second input to multiplier is from scaler memory 70. The scaler quantity stored in scaler memory 70 is determined from previous runs of the laser gyroscope system wherein data is taken in order to determine this scaler quantity.

The scaler quantity (s) provides the correction factor for producing the compensated, gyroscope output frequency, $\Delta f_g$, as a function of the dihedral frequency which varies with time due to, for example, optical power variations.

Thus, $\Delta f_g$ is maintained substantially invariant or independent of changes due to optical power variations and other inherent laser cavity losses. During a test run of the laser gyroscope, the gyroscope output, $\Delta f_G$, is recorded over a period of time; similarly, the dihedral frequency is recorded over the same period of time. Then, the scaler quantity is calculated as the ratio of the rate of change of the gyroscope output with respect to the rate of change of the dihedral frequency, and the resulting scaler quantity is stored in scaler memory 70. Multiplier 72 multiplies the dihedral frequency ($\Delta f_D$) he scaler quantity (s) from scaler memory 70, and this factor s $\Delta f_D$ to the sum 74 circuit; a second input to the sum 74 circuit is obtained from the difference 64 circuit which subtracts $G_2$ from $G_1$ producing an uncompensate $\Delta f_G$ signal. The sum 74 circuit produces the power compensated gyroscope output frequency $\Delta f_g$.

Processor 61 may be embodied by electronic devices readily known to one skilled in the art, or depending upon the availability and type of computer being used in a laser gyroscope system, the functions being performed by processor 61 may be accomplished within said computer by a software program utilizing the inherent hardware of said computer.

Referring now to FIG. 2, there is shown a laser gain curve as a function of frequency. Four lasing modes or frequencies of the multi-oscillator ring laser gyroscope are shown as $f_1$, $f_2$, $f_3$ and $f_4$. An original, four-fold degenerate, longitudinal mode represented by $f_0$ is split into a left-circularly polarized (LCP) mode 90 and a right-circularly polarized (RCP) mode 92 as a result of the reciprocal image rotation feature of a non-planar ring. Each polarization is further split by the non-reciprocal Faraday rotator resulting in the four distinct lasing frequencies 94–97. Rotation in one direction of the ring laser gyroscope cavity 20, as shown in FIG. 1, shifts each of these four frequencies by $\frac{1}{4}\Delta f_G$ in the senses shown in FIG. 2 yielding the four lasing frequencies $f_1$, $f_2$, $f_3$ and $f_4$ (as shown by the solid lines). Frequencies $f_1$ and $f_4$ circulate in a clockwise spacial direction while frequencies $f_2$ and $f_3$ circulate in a counterclockwise spacial direction in said cavity 20. However, the frequency splittings, as illustrated in FIG. 2, are greatly exaggerated. Typically, the dihedral frequency ($\Delta f_D$) is in the 600 MHz range, the Faraday frequency ($\Delta f_F$) is in the 500 KHz range and the gyroscope output frequency is in the 10 Hz range. The dihedral frequency ($\Delta f_D$) is defined by the following equation:

$$f_D = \tfrac{1}{2}(f_4+f_3) - \tfrac{1}{2}(f_2+f_1),$$

wherein
$\tfrac{1}{2}(f_4+f_3)$ is the mean value of the LCP pair of waves and
$\tfrac{1}{2}(f_2+f_1)$ is the mean value of the RCP pair of waves.
The Faraday frequency ($\Delta f_F$) is defined by the following equation:

$$\Delta f_F = \tfrac{1}{2}(f_4-f_3) + \tfrac{1}{2}(f_2-f_1),$$

Based on these equations, it follows that:
$\Delta f_D + \Delta f_F = f_4 - f_1$ which are the traveling waves in a clockwise spacial direction and likewise,
$\Delta f_D - \Delta f_F = f_3 - f_2$ which are the traveling waves in a counterclockwise spacial direction.

Figure 3:
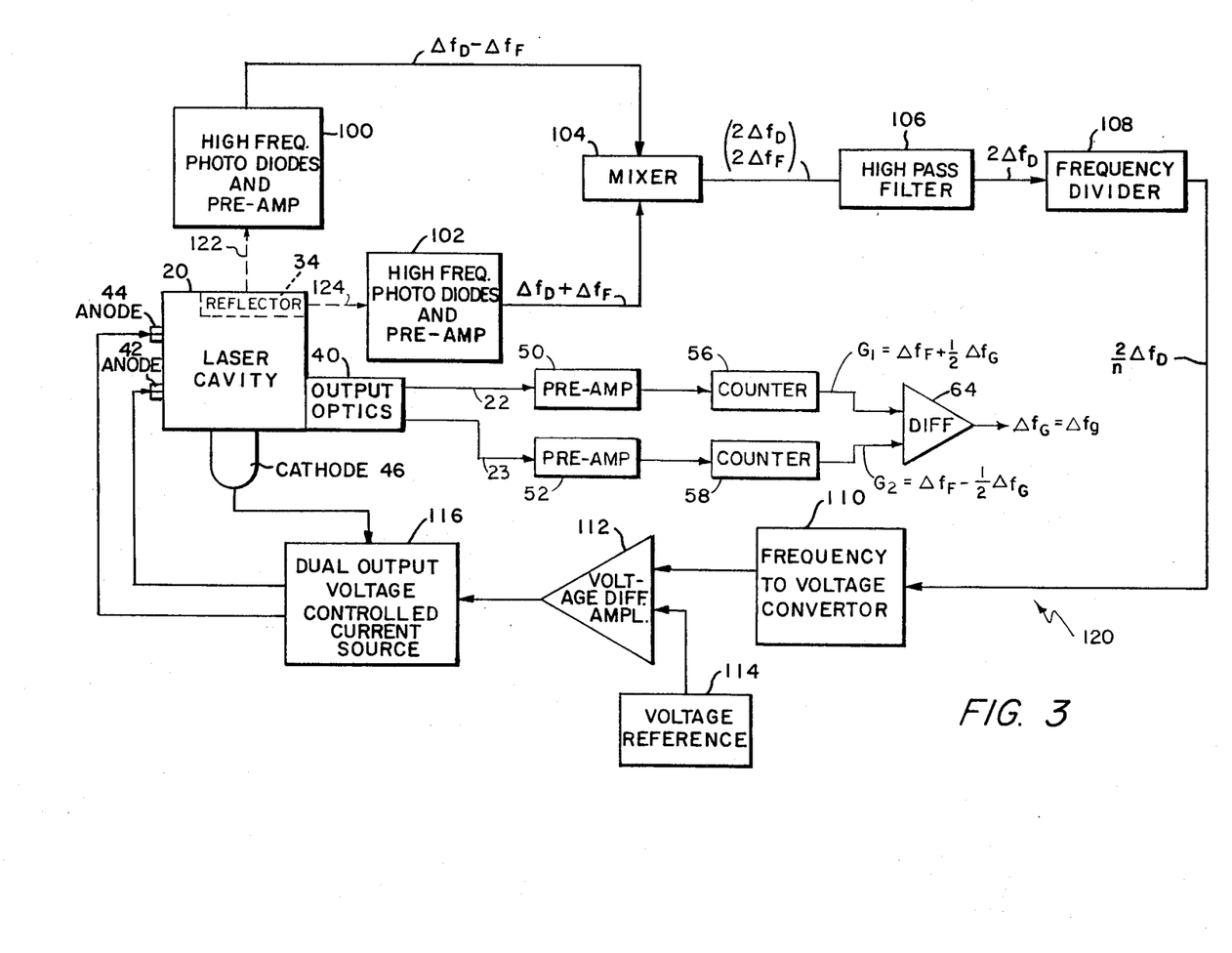
FIG. 3 is a block diagram of an alternate embodiment of the invention comprising a feedback path for adjusting a discharge control current source and varying the laser cavity gain as a function of the dihedral frequency.

Referring now to FIG. 3, there is shown an alternate embodiment for providing power compensation for the laser gyroscope output frequency ($\Delta f_G$) by changing the gain of the laser cavity via a feedback network 120 as a function of variations in the dihedral frequency and thereby maintaining the gyroscope output frequency substantially invariant or independent of various error sources. One of the reflectors 34 in laser cavity 20 provides the optical signals ($\Delta F_D - \Delta f_F$) and ($\Delta F_D + \Delta F_F$) shown diagrammatically in FIG. 3 by dotted lines 122 and 124; they are detected and amplified by the high frequency photodiodes and preamplifiers 100 and 102, respectively, resulting in the electrical equivalent of these optical signals. The outputs of both high frequency photodiodes and preamplifiers 100 and 102 are each coupled to a mixer 104. Mixer 104 generates the signals $2\Delta f_F$ and $2\Delta f_D$ which are coupled to a high pass filter 106 where only the $2\Delta f_D$ signal is allowed to pass through it to frequency divider 108. The output of frequency divider 108 is coupled to a frequency-to-voltage converter 110. The frequency divider 108 divides down by a factor "n" the frequency at its input $2\Delta f_D$ of any sub-multiple frequency ($2/n\Delta f_D$ suitable n for said converter 110, the design of which is readily known to one skilled in the art. The frequency-to-voltage converter 110 converts its input frequency to a voltage; this voltage is coupled to a voltage difference amplifier 112 which senses a change in voltage at one of its inputs with respect to a voltage reference 114 provided at a second input to said amplifier 112. The output of voltage difference amplifier 112 is coupled to a dual voltage controlled current source 116 which varies the potential between the anodes 42 and 44 and the cathode 46 of laser cavity 20 thereby varying the gain of the gyroscope for providing optical power compensation for the laser gyroscope output frequency ($\Delta f_G$) which in this embodiment is equivalent to $\Delta f_g$ in the previous embodiment.

The output optics 40 extracts a portion of each wave circulating within the laser cavity 20 to produce two outputs, $G_1$ and $G_2$, each one of which represents the difference in frequency between wave pairs having the same sense of circular polarizations within the laser cavity 20, as shown in FIG. 2. The details of the embodiment of outputs optics 40 are the same as described for FIG. 1. Likewise, the detected laser cavity outputs 22 and 23 are fed to preamplifiers 50 and 52, respectively, which are connected to counters 56 and 58, respectively, producing the two outputs $G_1$ and $G_2$. The difference 64 circuit subtracts $G_2$ from $G_1$ producing the compensated output frequency $\Delta f_G$ which equals $\Delta f_g$ for the embodiment of FIG. 3.

This concludes the description of the embodiments of the invention described herein. However, many modifications and alterations will be obvious to one skilled in the art without departing from the spirit and scope of the inventive concept. Therefore, it is intended that the scope of this invention be limited only by the appended claims.

What is claimed is:

1. Means having a closed path with a gain medium for producing a plurality of circularly polarized counter-traveling electromagnetic waves of a first polarization sense and a second polarization sense;
   means for producing a direction-dependent phase shift to said counter-traveling electromagnetic waves resulting in a frequency splitting between said counter-traveling waves of the same polarization sense, each of said counter-traveling waves being of a different frequency and a combination of said electromagnetic waves traveling in the same direction comprising a dihedral frequency;
   means coupled to said counter-traveling electromagnetic waves producing means for detecting said electromagnetic waves traveling in the same directions comprising said dihedral frequency; and
   means for compensating an output signal in accordance with variations in said dihedral frequency, said output signal being representative of a rotation-induced frequency shift of said counter-traveling electromagnetic waves within said closed path.

2. In combination:
   means having a closed path with a gain medium for producing a plurality of circularly polarized counter-traveling electromagnetic waves of a first polarization sense and a second polarization sense;
   means for producing a direction-dependent phase shift to said waves resulting in a frequency splitting between said counter-traveling waves of the same polarization sense, each of said waves being of a different frequency;
   first detecting means for detecting said polarized waves traveling in the same direction, a combination of said waves traveling in the same direction comprising a dihedral frequency;

second detecting means for detecting at least two signals, generated by said wave producing means including output optics, representative of a rotation-induced frequency shift; and means for processing said polarized waves from said first detecting means with said signals from said second detecting means for compensating an output signal in accordance with said dihedral frequency.

3. The combination as recited in claim 2 wherein:
said first polarization sense comprises a left circular polarization and said second polarization sense comprises a right circular polarization.

4. The combination as recited in claim 2 wherein:
said first detecting means comprises a high frequency photodiode disposed immediately adjacent to a reflector in said wave producing means.

5. The combination as recited in claim 2 wherein:
the frequency of said waves in the same direction from said first detecting means comprises either the difference between said dihedral frequency and a Faraday frequency or the sum of said dihedral frequency and said Faraday frequency.

6. The combination as recited in claim 2 wherein:
a first of said signals from said second detecting means comprises the difference between said Faraday frequency and one-half of said rotation induced frequency shift.

7. The combination as recited in claim 2 wherein:
a second of said signals from said second detecting means comprises the sum of said Faraday frequency and one-half of said rotation-induced frequency shift.

8. The combination as recited in claim 2 wherein said processing means further comprises:
means for combining said detected signals from said wave producing means with said detected circularly polarized waves traveling in the same direction thereby producing said dihedral frequency;
means for storing a scaler quantity;
means for multiplying said dihedral frequency by said scaler quantity; and
means for summing said rotation-induced frequency shift with an output of said multipling means, for producing said compensated output signal.

9. In combination:
means having a closed path with a gain medium for producing a plurality of circularly polarized counter-traveling electromagnetic waves of a first polarization sense and a second polarization sense;
means for producing a direction-dependent phase shift to said waves resulting in a frequency splitting between said counter-traveling waves of the same polarization sense, each of said waves being of a different frequency;
first detecting means for detecting said polarized waves traveling in the same direction;
second detecting means for detecting at least two signals, generated by said waves producing means including output optics, representative of a rotation-induced frequency shift;
means for processing said signals from said second detecting means to generate a Faraday frequency;
means for combining said polarized waves from said first detecting means with said Faraday frequency to generate a dihedral frequency;
means for storing a scaler quantity, said scaler quantity being determined from a ratio of a rate of change of said rotation-induced frequency shift to a rate of change of said dihedral frequency;
means for multiplying said dihedral frequency by said scaler quantity; and
means for summing said rotation-induced frequency shift with an output of said multipling means producing a compensated output signal in accordance with said dihedral frequency.

10. The combination as recited in claim 9 wherein:
said first polarization sense comprises a left circular polarization and said second polarization sense comprises a right circular polarization.

11. The combination as recited in claim 9 wherein:
said first detecting means comprises a high frequency photodiode disposed immediately adjacent to a reflector in said waves producing means.

12. The combination as recited in claim 9 wherein:
the frequency of said waves in the same direction from said first detecting means comprises either the difference between said dihedral frequency and a Faraday frequency or the sum of said dihedral frequency and said Faraday frequency.

13. The combination as recited in claim 9 wherein:
a first of said signals from said second detecting means comprises the difference between said Faraday frequency and one-half of said rotation-induced frequency shift.

14. The combination as recited in claim 9 wherein:
a second of said signals from said second detecting means comprises the sum of said Faraday frequency and one-half of said rotation-induced frequency shift.

15. The combination as recited in claim 9 wherein:
said polarized waves from said first detecting means travel in either a clockwise direction or a counterclockwise direction.

16. In combination:
means having a closed path with a gain medium for producing a plurality of circularly polarized counter-traveling electromagnetic waves of a first polarization sense and a second polarization sense;
means for producing a direction-dependent phase shift to said waves resulting in a frequency splitting between said counter-traveling waves of the same polarization sense, each of said waves being of a different frequency;
means for detecting independently said polarized waves traveling in only a clockwise direction and said polarized waves traveling in only a counterclockwise direction, said polarized waves in each direction comprising a dihedral frequency; and
means for processing both of said clockwise and counterclockwise polarized waves, said processing means providing signals for adjusting said gain medium for compensating an output signal in accordance with variations in said dihedral frequency.

17. The combination as recited in claim 16 wherein:
said first polarization sense comprises a left circular polarization and said second polarization sense comprises a right circular polarization.

18. The combination as recited in claim 16 wherein:
said detecting means comprises high frequency photodiodes disposed immediately adjacent to a reflector in said waves producing means.

19. The combination as recited in claim 16 wherein:
the frequency of said counterclockwise polarized waves comprises the difference between said dihedral frequency and a Faraday frequency, and the frequency of said clockwise polarized waves comprises the sum of said dihedral frequency and said Faraday frequency.

20. The combination as recited in claim 16 wherein said processing means further comprises:
means for combining both of said clockwise and counterclockwise polarized waves for producing said dihedral frequency;
means for converting said dihedral frequency to a voltage; and
means coupled to said converting means for providing said adjusting signals for said gain medium.

21. In combination:
means having a closed path with a gain medium for producing a plurality of circularly polarized counter-traveling electromagnetic waves of a first polarization sense and a second polarization sense;
means for producing a direction-dependent phase shift to said waves resulting in a frequency splitting between said counter-traveling waves of the same polarization sense, each of said waves being of a different frequency;
means for detecting independently said polarized waves traveling in only a clockwise direction and said polarized waves traveling in only a counterclockwise direction;
means for combining both of said clockwise and counterclockwise polarized waves for producing a dihedral frequency;
means for converting said dihedral frequency to a voltage;
means coupled to said converting means for adjusting a voltage controlled current source in accordance with variations of said dihedral frequency, said current source being coupled to said wave producing means to control said gain medium.

22. The combination as recited in claim 21 wherein:
said first polarization sense comprises a left circular polarization and said second polarization sense comprises a right circular polarization.

23. The combination as recited in claim 21 wherein:
said detecting means comprises high frequency photodiodes disposed immediately adjacent to a reflector in said waves producing means.

24. The combination as recited in claim 21 wherein:
the frequency of said counterclockwise polarized waves comprises the difference between a dihedral frequency and a Faraday frequency, and the frequency of said clockwise polarized waves comprises the sum of said dihedral frequency and said Faraday frequency.

25. The combination as recited in claim 21 wherein:
said adjusting means provides compensation for an output signal by varying said gain medium.

26. Apparatus comprising:
means for supporting in a closed path two pairs of electromagnetic waves, said waves in each of the two pairs of electromagnetic waves traveling in opposite directions, a first pair of said two pairs of electromagnetic waves having a first sense of polarization and a first pair of frequencies and a second pair of said two pairs of electromagnetic waves having a second opposite sense of polarization and a second pair of frequencies, the difference between the mean of the first pair of frequencies and the mean of the second pair of frequencies varying as a function of time;
means for producing a signal related to the difference between the mean value of the first pair of frequencies and the mean value of the second pair of frequencies;
means responsive to the produced signal for adjusting the apparatus in accordance with the produced signal to produce an output signal substantially invariant with variations in the difference between the mean of the first pair of frequencies and the mean of the second pair of frequencies and representative of the difference between the difference between the first pair of frequencies and the difference between the second pair of frequencies.

27. A method of compensating an output signal of a multi-oscillator ring laser gyroscope comprising the steps of:
producing in a closed path with a gain medium a plurality of circularly polarized counter-traveling electromagnetic waves of a first polarization sense and a second polarization sense;
producing a direction-dependent phase shift to said counter-traveling electromagnetic waves resulting in a frequency splitting between said counter-traveling waves of the same polarization sense, each of said counter-traveling waves being of a different frequency and a combination of said electromagnetic waves traveling in the same direction comprising a dihedral frequency;
detecting said dihedral frequency; and
compensating said output signal in accordance with variations in said dihedral frequency, said output signal being representative of a rotation-induced frequency shift of said counter-traveling electromagnetic waves within said closed path.

28. A method of compensating an output signal of a multi-oscillator ring laser gyroscope comprising the steps of:
producing in a closed path with a gain medium a plurality of circularly polarized counter-traveling electromagnetic waves of a first polarization sense and a second polarization sense;
producing a direction-dependent phase shift to said waves resulting in a frequency splitting between said counter-traveling waves of the same polarization sense, each of said waves being of a different frequency;
detecting said polarized waves traveling in the same direction, a combination of said waves in the same direction comprising a dihedral frequency;
detecting at least two signals representative of a rotation-induced frequency shift; and
processing said detected polarized waves with said detected signals for compensating said output signal in accordance with said dihedral frequency.

29. The method as recited in claim 28 wherein:
said step of detecting at least one direction of said circularly polarized counter-traveling waves comprises detecting a frequency of either the difference between a dihedral frequency and a Faraday frequency or a frequency of the sum of said dihedral frequency and said Faraday frequency.

30. The method as recited in claim 29 wherein:
said step of detecting at least two signals comprises a first of said signals being the difference between said Faraday frequency and one-half of said rotation-induced frequency shift and a second of said signals being the sum of said Faraday frequency and one-half of said rotation-induced frequency shift.

31. The method as recited in claim 28 wherein said processing step further comprises the steps of:
combining said detected signals with said detected circularly polarized waves traveling in the same direction for producing said dihedral frequency;
storing a scaler quantity determined from a ratio of a rate of change of the gyroscope output signal to a rate of change of said dihedral frequency;
multiplying said dihedral frequency by said scaler quantity; and
summing a rotation-induced frequency shift with said dihedral frequency multiplied by said scaler quantity for producing said compensated output signal.

32. A method of compensating an output signal of a multi-oscillator ring laser gyroscope comprising the steps of:
producing in a closed path with a gain medium a plurality of circularly polarized counter-traveling electromagnetic waves of a first polarization sense and a second polarization sense;
producing a direction-dependent phase shift to said waves resulting in a frequency splitting between said counter-traveling waves of the same polarization sense, each of said waves being of a different frequency;
detecting independently said polarized waves traveling in only a clockwise direction and said polarized waves traveling in only a counterclockwise direction, said polarized waves in each direction comprising a dihedral frequency; and
processing both of said clockwise and counterclockwise polarized waves, said processing providing signals for adjusting said gain medium for compensating an output signal of said gyroscope in accordance with variations in said dihedral frequency.

33. The method as recited in claim 32 wherein:
said step of detecting independently said polarized counter-traveling waves comprises detecting a frequency of a first wave being the difference between a dihedral frequency and a Faraday frequency and a frequency of a second wave being the sum of said dihedral frequency and said Faraday frequency.

34. The method as recited in claim 32 wherein said processing step further comprises the steps of:
combining both of said clockwise and counterclockwise polarized waves for producing said dihedral frequency;
converting said dihedral frequency to a voltage; and
adjusting said gain medium of said gyroscope in accordance with said voltage for compensating said gyroscope output signal.

* * * * *

UNITED STATES PATENT AND TRADEMARK OFFICE
CERTIFICATE OF CORRECTION

PATENT NO. : 4,652,132

DATED : March 24, 1987

INVENTOR(S) : William H. Nelson and N. Zampiello

It is certified that error appears in the above-identified patent and that said Letters Patent is hereby corrected as shown below:

Title page:

In the ABSTRACT, line 3 delete "accordannce" and replace with --accordance--

Column 1, line 64 delete "sometime-s" and replace with --sometimes--

Column 2, line 1 delete "planar" and replace with --non-planar--

Column 5, line 53/54 delete "assighee" and replace with --assignee--

Column 6, line 1 delete "$\Delta F_D - \Delta f_F$" and replace with --$\Delta f_D - \Delta f_F$--

Column 6, line 6 delete "$\Delta F_D - \Delta f_F$" and replace with --$\Delta f_D - \Delta f_F$--

Column 6, line 16 delete "$(\Delta f_D - \Delta F_F)$" and replace with --$(\Delta f_D - \Delta f_F)$--

Column 6, line 33 delete "$\Delta F_D - \Delta f_F$" and replace with --$\Delta f_D - \Delta f_F$--

Column 7, line 26 delete "$(F_2 + f_1)$" and replace with --$(f_2 + f_1)$--

UNITED STATES PATENT AND TRADEMARK OFFICE
CERTIFICATE OF CORRECTION

PATENT NO. : 4,652,132

DATED : March 24, 1987

INVENTOR(S) : William H. Nelson and N. Zampiello

It is certified that error appears in the above-identified patent and that said Letters Patent is hereby corrected as shown below:

Column 7, line 49 delete "$(\Delta F_D + \Delta f_F)$ and $(\Delta F_D + \Delta F_F)$" and replace with --$(\Delta f_d + \Delta f_F)$ and $(\Delta f_D + \Delta f_F)$--

Signed and Sealed this

Twenty-third Day of August, 1988

Attest:

DONALD J. QUIGG

*Attesting Officer*   *Commissioner of Patents and Trademarks*